United States Patent [19]

Wyeth

[11] Patent Number: 4,990,278
[45] Date of Patent: Feb. 5, 1991

[54] CORROSION INHIBITED DEICING COMPOSITION AND METHOD OF ITS USE

[75] Inventor: John T. Wyeth, Clayton, Ind.

[73] Assignee: Reilly Industries, Inc., Indianapolis, Ind.

[21] Appl. No.: 470,843

[22] Filed: Jan. 26, 1998

[51] Int. Cl.$^5$ .............................................. C09K 3/18
[52] U.S. Cl. .......................................... 252/70; 106/13
[58] Field of Search .............................. 106/13; 252/70

[56] References Cited

U.S. PATENT DOCUMENTS 4,803,007 2/1989 Garber .................................. 252/70

FOREIGN PATENT DOCUMENTS 3225686 5/1986 Japan .

Primary Examiner—Prince E. Willis
Assistant Examiner—William S. Parks
Attorney, Agent, or Firm—Woodard, Emhardt, Naughton, Moriarty & McNett

[57] ABSTRACT

A low-temperature corrosion inhibited deicing composition is disclosed which comprises a major portion of magnesium chloride and an effective amount of an inhibitor including a polyphosphate salt to reduce corrosion, or a solution thereof. The solution form is preferred. Additional preferred aspects are provided where the inhibitor also includes a zinc-containing salt, and where the deicing composition is free from (or at least substantially so) chloride ions other than those due to the magnesium chloride. A method for low-temperature deicing of bridgework is described which includes the use of the inhibited deicing composition.

30 Claims, No Drawings

CORROSION INHIBITED DEICING COMPOSITION AND METHOD OF ITS USE

BACKGROUND OF THE INVENTION

The present invention relates generally to methods and compositions for melting snow and/or ice covered surfaces. In particular, this invention relates to a corrosion inhibited deicing composition and the methods for its use in melting snow and ice from roadway surfaces.

As a part of some state and local highway departments' "dry pavement" policies designed to minimize ice and snow related traffic accidents, melting agents for removing hazardous ice and snow are routinely applied to roadway surfaces. For some time, sodium chloride has been the most widely used melting agent. However, sodium chloride is strongly corrosive of many structural metals. Consequently, the current use of sodium chloride to melt snow and ice on roadways has resulted in serious corrosion to the metal parts of highway structures and to the vehicles that travel the treated surfaces. The worst damage from corrosion occurs on bridges. Since bridges are one of the most expensive structures in a highway system, considerable effort and expense are put forth annually to preserve and repair them.

Magnesium chloride is also known to effectively melt ice and snow and because it melts ice at a much lower temperature than sodium chloride, it is often a preferred melting agent. Magnesium chloride is especially preferred in areas where seasonal temperatures often fall well below the freezing point of sodium chloride solutions, rendering the sodium salt useless as a melting agent until the ambient temperature increases sufficiently. Many highway departments, therefore, use solutions of magnesium chloride to melt ice. Even though magnesium chloride is a better low temperature melting agent than sodium chloride, magnesium chloride is similarly corrosive to highway structures and vehicles.

In addition, magnesium chloride has been used as an additive in sodium chloride based melting agents. U.S. Pat. No. 3,505,234, issued to Pinckernelle in 1970, teaches that magnesium chloride (or calcium chloride) and an alkali salt of an iron cyanide, when added to a major portion of sodium chloride, prevent caking and freezing of the resulting deicing composition. The magnesium chloride may be in an aqueous solution (brine) which is added to the rock salt sodium chloride or it may be added dry.

Similarly, U.S. Pat. No. 3,772,202 issued to Neitzel in 1973 describes that magnesium chloride-containing brine solutions entrained in a solid sodium chloride phase results in a road salt composition which remains moist and spreadable at very low temperatures. The road salt composition is saturated in sodium chloride, the major component thereof. Ferrocyanides are an optional anti-caking ingredient. U.S. Pat. No. 3,833,504, also to Neitzel and issued in 1974, discloses a method for making these entrained brine compositions.

Efforts have been directed to minimizing the corrosive effects of road salt compositions. Such efforts mainly include the addition of corrosion inhibiting agents which apparently act to neutralize the tendency of the salt to corrode. It is known to use divalent metal ion salts and suitable counterions including chlorides in addition to polyphosphate salts to inhibit the corrosivity of sodium chloride. For example U.S. Pat. No. 4,803,007 issued to Garber in 1989 discloses an inhibited deicing composition which includes a major amount of sodium chloride and also a corrosion inhibitor. The corrosion inhibitor is preferably either a zinc halide, acetate, nitrate, oxide or sulfate or a divalent magnesium source. It is interesting to note that the divalent magnesium source disclosed in the patent may be corrosive magnesium chloride salt. In addition to the zinc and magnesium source, the inhibitor includes a polyphosphate salt which is tripolyphosphate, hexametaphosphate or a mixture thereof.

In combination with other materials, polyphosphates have proven useful in preventing oxidative corrosion in recirculating cooling water systems which also contain chlorine as an antibacterial agent. For example, U.S. Pat. No. 4,108,790 to Foroulis issued in 1978 describes the use of polyphosphates, including alkali metal polyphosphates such as sodium hexametaphosphate. Foroulis teaches that the polyphosphate, to be effective, must be used along with a gluconate or else rapid conversion to insoluble orthophosphates occurs which adds to the formation of undesirable scale in the water system. The combination of gluconate and polyphosphate is taught to produce a synergistic effect which is not achieved by using either ingredient alone.

Spent sulfite liquor has been used to reduce the corrosivity of alkali metal or alkaline earth metal chloride salts, including sodium and magnesium chloride salts. U.S. Pat. No. 4,668,416 issued to Neal in 1987 describes a process for making a deicing or dust control agent with reduced corrosivity which includes a spent sulfite liquor and a chloride salt in a proportion so that the lignosulfonates are present from about 1:25 to 15:1 of the metal chloride.

In contrast, the applicant has surprisingly discovered that polyphosphate salts may be used alone to effectively inhibit corrosion caused by magnesium chloride. The applicant is unaware of any use of polyphosphate salts to prevent corrosion caused by magnesium chloride. The inhibition is enhanced when zinc salts are added. Moreover, the applicant has discovered that if excess chloride ion (i.e. above that present as a counterion to magnesium) is kept to a minimum, the inhibitor is surprisingly more effective. The present invention thus limits the corrosiveness of ice and snow melting magnesium chloride salt, extending the life of highway structures and reducing maintenance thereon.

SUMMARY OF THE INVENTION

Accordingly, one preferred embodiment of the invention involves a corrosion inhibited low-temperature deicing composition comprising a major portion of magnesium chloride and an effective amount of an inhibitor including a polyphosphate salt such as a metaphosphate salt to reduce corrosion, or a solution thereof. The solution form is preferred and in other preferred aspects the inhibitor also includes a zinc-containing salt and the deicing composition consists essentially of an aqueous solution of magnesium chloride, polyphosphate salt and the zinc-containing salt.

Another preferred embodiment includes a method for low-temperature deicing of a roadway bridge. This method includes the step of spreading a corrosion inhibited deicing composition comprising a major portion of magnesium chloride and an effective amount of an inhibitor including a polyphosphate salt to reduce corrosion, or a solution thereof, onto a snow or ice-covered surface of the bridge. Additional preferred aspects of this method embodiment are analogous to preferred aspects of the embodiment discussed immediately above.

It is an object of the present invention to provide an improved low-temperature corrosion inhibited deicer.

It is a further object of the present invention to provide an improved method for removing snow and/or ice from roadway surfaces.

Other objects and advantages of the invention will become apparent from reading the description which follows.

DESCRIPTION OF THE PREFERRED EMBODIMENTS

For the purposes of promoting an understanding of the principles of the invention, reference will now be made to specific embodiments of the invention and specific language will be used to describe the same. It will nevertheless be understood that no limitation of the scope of the invention is thereby intended, such alterations and further modifications, and such further applications of the principles of the invention as discussed are contemplated as would normally occur to one skilled in the art to which the invention relates.

In accordance with the discussion above, a first embodiment of the invention involves a low-temperature corrosion inhibited deicing composition which includes a major weight portion of magnesium chloride and an effective amount of an inhibitor including a polyphosphate salt to reduce corrosion of ferrous metals, or a solution thereof. Although compositions according to the invention can be provided in a dry mix form, the solution form is preferred since this state eases mixing the components and, consequently, facilitates the application of a correct ratio of magnesium chloride to inhibitor. Additionally, the use of two or more systems requires adjustment on the rate of application of each. For example, if the magnesium chloride brine solution is applied and subsequently the inhibitor is applied, of if the phases are mixed immediately prior to application, for example in the applicator equipment, incomplete mixing can result leading to non-uniform application. Non-uniform application may result in some surfaces covered with insufficient inhibitor. Further, dry pre-mixing of large batches may result in incomplete mixing so that when smaller amounts are removed from the entire batch, some may contain insufficient inhibitor while others contain excess. This is not particularly efficient or economical.

Accordingly, in the preferred solution form, the magnesium chloride ($MgCl_2$) content of the brine may be between about 1% and about 50% by weight of the solution and is preferably about 25% by weight of the solution before the addition of inhibitor. As those skilled in this field will recognize and appreciate, substantially pure magnesium chloride brine of this concentration is commonly available from conventional harvesting procedures and evaporation of salt waters from the Great Salt Lake and surrounding areas, or may be readily made by dissolving an appropriate quantity of $MgCl_2$ in water. In any event, not taking into account the weight of the solvent, the magnesium chloride constitutes a major weight portion of the low-temperature deicing composition and most preferably at least about 90-95% by weight of the composition.

As to the inhibitor, it includes polyphosphate and is present in an effective amount to reduce the corrosion of metals, particularly ferrous metals, by aqueous solutions of magnesium chloride. In this vein, preferred polyphosphates are water soluble metaphosphate salts, with sodium metaphosphate being most preferred. Additionally, the inhibitor has also preferably included zinc which is provided by a water-soluble zinc-containing salt. The zinc sulfate salt is most preferred, although other counterions may be used. In any event, zinc chloride is preferably not used, as another preferred aspect of the invention involves the applicant's discovery that keeping chloride ion in excess of that from the magnesium chloride to a minimum significantly enhances the performance of the inhibitor.

The total amount of inhibitor present is a minor weight amount as compared to the magnesium chloride present. Preferably the corrosion inhibitor is present in an amount between about 0.005% and about 49% by weight relative to the amount of magnesium chloride present, and most preferably between about 0.005% and 4%. Within that range, when in solution the inhibitor preferably constitutes about 0.001% to about 20% by weight of the total inhibited deicing solution, and most preferably between about 0.1% and 10%. Additionally, it is preferred that the inhibitor have a weight ratio of zinc to polyphosphate of about 1:2 to about 1:10 and most preferably about 1:5.

As noted, in practicing the invention it is preferred and important to minimize the presence of extraneous chloride ions. Therefore, significant presence of sodium chloride or calcium chloride in the preferred composition is avoided. The presence of other sources of chloride ions will also dilute the corrosion inhibiting effect, requiring the compensatory adjustment of inhibitor concentration. Accordingly, preferred compositions are substantially free from chloride ion other than that present from the magnesium chloride. Additional preferred compositions consist essentially of the inhibitor and the magnesium chloride, or of aqueous solutions of inhibitor and magnesium chloride as described herein.

In use, the deicing solution may be applied to road surfaces as the sole ice melting agent. It is contemplated, however, that the solution may optionally be used in connection with a traction-enhancing agent such as sand, cinders or other suitable materials known to increase friction between vehicular traffic and the ice covered surface. Additionally, suitable dyes can be mixed in with the solution which can enhance the melting of ice or snow by increasing the absorption of radiant energy.

As indicated above, while it is preferred that the deicing composition be provided in solution, it is also contemplated that the composition can be provided as a solid, dry mix. A dry mixture could be, for example, prepared by blending the ingredients dry, or by first mixing the appropriate amounts in solution and then drying the resulting mixed solution to produce a solid product. This solid can then either be applied as a dry mix or alternatively mixed with an appropriate solvent, preferably water before application.

Accordingly, in the solid form, the $MgCl_2$ and the corrosion inhibitor are supplied as a dry mix, with the magnesium chloride constituting a major amount by weight (most preferably about 90-95% by weight) of the composition and the corrosion inhibitor constituting a minor amount. As with the solution form, the inhibitor includes a polyphosphate salt and in a preferred embodiment also includes a zinc-containing salt. Also, preferred polyphosphates are water soluble metaphosphate salts, with sodium hexametaphosphate being most preferable. Additionally, zinc is preferably supplied as a water soluble salt, with zinc sulfate being most preferred to this point. Again, it is preferable that zinc chloride not be used.

If it is desired to dissolve the dry deicing composition in order to apply it in solution form, after dissolution, the amount of inhibitor present is preferably between about 0.001% and about 20% by weight of the total inhibited deicing solution, and is most preferably between about 0.1% and 10%. The magnesium chloride preferably constitutes between about 1% and about 50% by weight of the solution and most preferably is about 25%. In any event, consistent with the discussion above, not taking into account the solvent, the magnesium chloride constitutes a major weight amount of the deicing composition and the corrosion inhibitor constitutes a minor weight amount. Within these parameters it is preferred that the corrosion inhibitor be present in an amount between about 0.005% and about 49% by weight relative to the amount of magnesium chloride present, and most preferably between about 0.005% and about 4%.

A further embodiment of the invention is a method for low-temperature deicing of roadways and bridges or other metal structures, using the inhibited deicing composition of the present invention in dry or preferably in solution form. In this embodiment, the inhibited deicing composition is spread on roadway bridges. Preferably, a 25% magnesium chloride solution containing about 1% of the corrosion inhibitor is spread by an appropriate means on the approach to a bridge and on the bridge itself. In addition, a source of traction, such as sand and/or cinders, may spread along with the inhibited deicer.

The inhibited deicer is spread on the approach to the bridge so as to prevent any uninhibited deicer which might be used on other non-bridge portions of the road surface from being carried onto the bridge by the vehicles using the road. Of course, the inhibited deicer composition is spread at such a rate as to effect the melting of snow and of ice on the bridge and approaching roadway. On contact the ice and/or snow begins to melt which in turn dilutes the inhibited deicer solution (or dry mix). It will be recognized that in order for the corrosion inhibitor to be most effective, it must be applied at such a concentration that will allow for this dilution. Accordingly, at present, the applicant has discovered that an about 1% concentration (i.e. about 10,000 ppm) of inhibitor may be diluted by a factor of at least 100 and still be effective to reduce corrosion of ferrous metals by magnesium chloride as can be seen from the following Example. Further, it will be understood that inhibition of corrosion will vary from application to application as many factors including the amount of snow or ice present as well as others will have an impact upon final results.

The invention will be further described by reference to the following Example which is set forth by way of illustration not intended to be limiting in scope.

EXAMPLE

Corrosion Inhibition by Various Zinc/Metaphosphate Mixtures

Mild steel coupons (plates measuring 2 inches by 1 inch by 0.06 inch) were subjected to the corrosive effects of aqueous solutions of magnesium chloride containing varying amounts of zinc sulfate and sodium hexametaphosphate. The coupons were weighed and then suspended in a humid environment and periodically wet (once per day) with a specified volume of the test solution. All tests were run at 23 deg C. The coupons were then reweighed to determine the mass lost. A control sample was similarly treated with uninhibited magnesium chloride of the same concentration. The results are presented in the Table below.

The inhibition effect was calculated as % inhibition according to the following:

$$\% \text{ Inhibition} = [C_u - C_I / C_u] \times 100$$

where $C_u$ = mils per year corrosion of the uninhibited solution and $C_I$ = mils per year corrosion of the inhibited solution.

TABLE

| % MgCl$_2$ | Time days | ZnSO$_4$7 H$_2$O ppm | (NaPO$_3$)$_6$ ppm | % Corrosion Inhibition |
|---|---|---|---|---|
| 3.0 | 30 | 0 | 100 | 25 |
| 3.0 | 30 | 0 | 1000 | 70 |
| 3.0 | 30 | 0 | 10000 | 83 |
| 3.0 | 30 | 100 | 0 | 25 |
| 3.0 | 30 | 1000 | 0 | 34 |
| 3.0 | 30 | 10000 | 0 | 38 |
| 3.0 | 30 | 10 | 90 | 81 |
| 3.0 | 30 | 50 | 50 | 94 |
| 3.0 | 30 | 25 | 75 | 90 |
| 3.0 | 30 | 75 | 25 | 93 |
| 3.0 | 30 | 90 | 10 | 93 |
| 3.0 | 30 | 500 | 500 | 96 |
| 3.0 | 30 | 250 | 750 | 93 |
| 3.0 | 30 | 750 | 250 | 94 |
| 3.0 | 30 | 0 | 0 | 0 |

While the invention has been described in detail in the foregoing description, the same is to be considered as illustrative and not restrictive in character, it being understood that only the preferred embodiment has been described and that all changes and modifications that come within the spirit of the invention are desired to be protected.

What is claimed is:

1. A corrosion inhibited low-temperature deicing composition consisting essentially of a major portion by weight of magnesium chloride and an effective amount of an inhibitor including a polyphosphate salt to reduce corrosion of ferrous metals, wherein said composition is free from any significant amount of chloride ion other than that present from the magnesium chloride, or an aqueous solution thereof.

2. The composition of claim 1 which consists essentially of said magnesium chloride and polyphosphate salt.

3. The composition of claim 1 which consists essentially of an aqueous solution of said magnesium chloride and polyphosphate salt.

4. The composition of claim 3 wherein said magnesium chloride comprises about 1% to about 50% by weight of said solution and said polyphosphate salt constitutes about 0.001 to about 20% by weight of said solution.

5. The composition of claim 4 wherein said polyphosphate salt comprises a metaphosphate.

6. The composition of claim 5 wherein said polyphosphate salt is sodium metaphosphate.

7. The composition of claim 1 wherein said inhibitor additionally comprises a zinc-containing salt.

8. The composition of claim 7 wherein said zinc-containing salt is substantially free from chloride ion.

9. The composition of claim 8 wherein said magnesium chloride is from a magnesium chloride brine.

10. The composition of claim 9 which consists essentially of said magnesium chloride, polyphosphate salt and zinc-containing salt.

11. The composition of claim 9 which consists essentially of an aqueous solution of said magnesium chloride, polyphosphate salt and zinc-containing salt.

12. The composition of claim 11 wherein said magnesium chloride constitutes about 1% to about 50% by weight of said solution and said polyphosphate salt and zinc-containing salt taken together constitute about 0.001% to about 20% by weight of said solution.

13. The composition of claim 12 wherein said magnesium chloride constitutes about 25% by weight of said solution.

14. The composition of claim 13 wherein said magnesium chloride constitutes at least about 90–95% by weight of the composition disregarding the weight of the solvent.

15. The composition of claim 14 wherein said polyphosphate salt is a metaphosphate salt.

16. The composition of claim 15 wherein said metaphosphate salt is sodium metaphosphate.

17. The composition of claim 16 wherein said zinc-containing salt is zinc sulfate.

18. A method for low-temperature deicing of a roadway bridge which comprises the step of applying a corrosion inhibited deicing composition consisting essentially of a major portion by weight of magnesium chloride and an effective amount of an inhibitor including a polyphosphate salt to reduce corrosion of ferrous metals, wherein said composition is free from any significant amount of chloride ion other than that present from the magnesium chloride, or an aqueous solution thereof, to a snow or ice-covered surface of the bridge.

19. The method of claim 18 in which in said applying step, the composition consists essentially of said magnesium chloride and polyphosphate salt.

20. The method of claim 18 in which in said applying step, the composition consists essentially of an aqueous solution of the magnesium chloride and polyphosphate salt and wherein the magnesium chloride constitutes about 1% to about 50% by weight of the solution and the polyphosphate salt constitutes about 0.001% to about 20% by weight of the solution.

21. The method of claim 18 in which in said applying step, the inhibitor additionally comprises a zinc-containing salt.

22. The method of claim 21 in which in said apply step, the zinc-containing salt is substantially free from chloride ion.

23. The method of claim 22 in which in said applying step, the and, magnesium chloride is from a magnesium chloride brine.

24. The method of claim 23 which in said applying step, the composition consists essentially of the magnesium chloride, polyphosphate salt and zinc-containing salt.

25. The method of claim 23 in which in said applying step, the composition consists essentially of an aqueous solution of the magnesium chloride, polyphosphate salt and zinc-containing salt.

26. The method of claim 25 in which in said applying step, the magnesium chloride constitutes about 1% about 50% by weight of the solution, and the polyphosphate salt and zinc-containing salt taken together constitute about 0.001% to about 20% by weight of the solution.

27. The method of claim 26 in which in said applying step, the polyphosphate salt is a metaphosphate salt.

28. The method of claim 27 in which in said applying step, the magnesium chloride constitutes about 25% by weight of the solution.

29. The method of claim 28 in which in said applying step, the metaphosphate salt is sodium metaphosphate.

30. The method of claim 29 in which in said applying step, the zinc-containing salt is zinc sulfate.

* * * * *

UNITED STATES PATENT AND TRADEMARK OFFICE
CERTIFICATE OF CORRECTION

PATENT NO. : 4,990,278

DATED : February 5, 1991

INVENTOR(S) : John T. Wyeth

It is certified that error appears in the above-identified patent and that said Letters Patent is hereby corrected as shown below:

On the title page, item (22) delete "Jan. 26, 1998" and insert in lieu thereof --Jan. 26, 1990--.

In column 8, line 18, please delete "and,".

Signed and Sealed this

Twenty-third Day of June, 1992

Attest:

DOUGLAS B. COMER

*Attesting Officer*  *Acting Commissioner of Patents and Trademarks*